United States Patent [19]

Scala et al.

[11] 3,744,642
[45] July 10, 1973

[54] INTERFACE CONDENSATION DESALINATION MEMBRANES

[75] Inventors: Luciano C. Scala, Murrysville; David F. Ciliberti; Daniel Berg, both of Pittsburgh, all of Pa.

[73] Assignee: Westinghouse Electric Corporation, Pittsburgh, Pa.

[22] Filed: Dec. 30, 1970

[21] Appl. No.: 102,620

[52] U.S. Cl. .................................. 210/500, 264/41
[51] Int. Cl. ............................................ B01d 31/00
[58] Field of Search .................. 210/500, 490, 321, 210/433, 23, 506, 507; 264/41, 49

[56] References Cited
UNITED STATES PATENTS

| | | | |
|---|---|---|---|
| 3,276,598 | 10/1966 | Michaels et al. | 210/500 |
| 3,567,632 | 3/1971 | Richter et al. | 210/500 X |
| 3,386,912 | 6/1968 | Lazare | 210/500 X |
| 3,276,996 | 10/1966 | Lazare | 210/22 |
| 3,462,362 | 8/1969 | Kollsman | 210/23 |
| 3,619,424 | 11/1971 | Blanchard et al. | 210/500 X |

*Primary Examiner*—Frank A. Spear, Jr.
*Attorney*—F. Shapoe and Alex Mich, Jr.

[57] ABSTRACT

A desalination membrane-substrate composite, effective to permit the effusion of pure water and the rejection of dissolved impurities, comprising a semipermeable membrane layer of polymeric material in contact with at least one side of a porous substrate is made by in-situ interfacial condensation of two fast reacting organic compounds in the presence of a porous substrate.

19 Claims, 3 Drawing Figures

PATENTED JUL 10 1973 3,744,642

WITNESSES
Edwin E. Bashaw
Daniel P. Cillo

INVENTORS
Luciano C. Scala, David F. Ciliberti
and Daniel Berg
BY Alex Mich Jr.
ATTORNEY

INTERFACE CONDENSATION DESALINATION MEMBRANES

BACKGROUND OF THE INVENTION

The main difficulty of the reverse osmosis desalination process appears to be the preparation of suitable semipermeable membranes, which are strong enough to withstand the prolonged passage of relatively high water flows at high pressures without compacting, while blocking or retarding the passage of selected ions at a useful rate.

Of the polymeric materials of various types investigated, the most efficient found to date is a modified cellulose acetate film. This type of material, however, is relatively difficult to prepare with exactly reproducible properties and is easily compacted. Delicate and sensitive procedures are necessary for its production, and these procedures do not lend themselves easily to continuous industrial fabrication. Preparation of this type membrane is, for example, described in U.S. Pat. No. 3,522,335. In general, a solution of cellulose acetate and a pore producing agent, such as formamide, dissolved in acetone is prepared. This solution is cast as a film and a portion of the organic solvents is evaporated. The film is then generally immersed in an ice water bath to leach out the pore producing agent to form a porous membrane having a very thin, dense, foraminous osmotic skin on one side.

Other methods of forming thin porous films are known. One method, widely used as a lecture and laboratory demonstration, is by interfacial polycondensation, as described in Chapter 2 of Condensation Polymers, Interscience Publishers, 1965, by P. W. Morgan. In this method, two fast reacting intermediates are dissolved in a pair of immiscible liquids. When these two solutions are brought together without stirring, a thin film of polymer will be formed at the interface. When the film is pulled from the area of the interface, more polymer forms, and a collapsed sheet or tube of polymer may be withdrawn continuously. The unsupported porous films formed by this method have found some use as osmosis membranes, but have been useful only in rejecting large impurity molecules, such as common dyes, and in general osmotic experiments. Coatings formed by this method have also found use in imparting shrink resistance to wool fabrics.

We have found that polymer precipitates formed by unstirred interfacial polycondensation, on and through supporting substrates having a particular porosity range, are coherent and tough, and are suitable for use as desalination membrane-composites having the ability to reject selected small salt impurity ions.

SUMMARY OF THE INVENTION

We have found that unstirred, interface condensation polymerization between a pair of fast reacting intermediates, such as an aliphatic or carbocyclic primary diamine and an aliphatic or carbocyclic diacyl halide or a carbocyclic disulfonyl halide, dissolved in solvents immiscible or relatively immiscible in each other, in-situ on and/or in a porous support, will provide reverse osmosis desalination membrane-substrate composites.

These supported interface condensation desalination membranes show excellent resistance to biodegradation and compaction under pressure, resulting in longer useful membrane life and can be made cheaply using mass production techniques. They also have excellent stability in hot water and better strength for high pressure usage than present cellulose acetate membranes.

BRIEF DESCRIPTION OF THE DRAWINGS

For a better understanding of the invention, reference may be made to the preferred embodiments, exemplary of the invention, shown in the accompanying drawings in which.

DESCRIPTION OF THE PREFERRED EMBODIMENTS

Osmosis occurs when two solutions of different concentrations in the same solvent are separated from one another by a semipermeable membrane. If the membrane is ideally semipermeable, that is, if it is permeable to the solvent and not to the solute, then a flow of solvent occurs from the more dilute into the more concentrated solution. This continues until the two solutions become equal in concentration or until the pressure in the chamber of the more concentrated solution rises to a certain well-defined value. The pressure difference at which no flow occurs is termed the osmotic pressure difference between the two solutions. If a pressure in excess of this osmotic pressure difference is applied to the more concentrated solution, then the solvent can be caused to flow into the more dilute solution. The names "reverse osmosis," "pressure osmosis" and "hyperfiltration" are used to describe this process. A detailed analysis of this phenomenon can be found in U. Merten, Desalination by Reverse Osmosis, M.I.T. Press, 1966.

Figure 1:
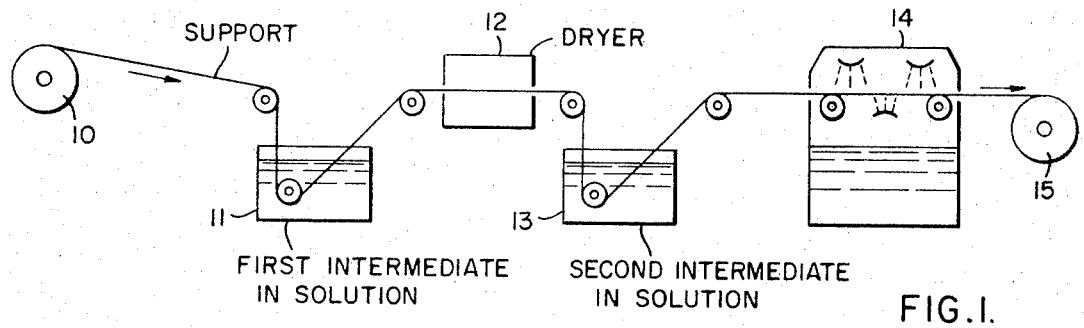
FIG. 1 is a schematic elevation illustrating one method for continuously fabricating a supported desalination membrane-substrate composite in accordance with this invention by low temperature, unstirred successive solution contact of a support substrate.

Membranes, suitable for reverse osmosis desalination application, can be made continuously, according to one method shown in FIG. 1. A suitable substrate made from such material as paper, interwoven glass fibers or porous sheets of polymeric fibers, is passed from a pay-off reel 10 and through a tank 11 containing a first organic reactant in solution. The pore size in the substrate material that supports the membrane was found to be a very important parameter and can vary upwards from about 0.03 microns diameter. Pore sizes below 0.05 microns in the support tend to restrict pure water flux. Pore sizes above 8 microns tend to decrease impurity ion rejection.

Low temperature polycondensation methods to provide desalination membranes should employ reactions which proceed at high rates and are capable of giving quantitative yields at ordinary temperatures. Condensation polymers can be obtained when difunctional organic compounds such as diacyl halides or disulfonyl halides are used as one intermediate and are reacted with polyfunctional compounds containing active hydrogens in the functional group, such as primary or secondary di or tri amines, or bis phenols as the other intermediate.

Low temperature interfacial polycondensation methods involve individually dissolving the organic compounds that are reactive with each other in a pair of immiscible liquids, one of which is preferably water. The water phase will contain the amine or phenol and some added alkali. The organic phase consists of the organic acid halide or the organic sulfonyl halide and an organic solvent such as carbon tetrachloride, dichloromethane, xylene or hexane. The polymerization reaction between the organic compounds takes place at or near the liquid interface to produce a polyamide, polyester or polysulfonamide membrane.

A typical reaction, and the preferred reaction for our method, employs either an aliphatic or a carbocyclic (aromatic or alicyclic) primary or secondary diamine or triamine with an aliphatic or carbocyclic (aromatic or alicyclic) diacyl halide. Preferably, a primary diamine solution is first deposited on the substrate and is the first organic compound in solution in tank 11 of FIG. 1.

The amine in solution can be an aromatic primary diamine that is soluble in water such as for example m-xylylenediamine ($C_6H_4(CH_2NH_2)_2$); an aliphatic secondary diamine that is soluble in water such as piperazine (diethylene diamine) or guanidine ($NH:C(NH_2)_2$); or preferably an aliphatic primary diamine having the formula

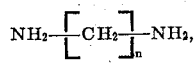

where $n = 2$ to $12$. Particularly suitable aliphatic primary diamines that are soluble in water are ethylene diamine; 1,2 propane diamine; 1,3 propane diamine; 1,4 butane diamine; 1,5 pentane diamine and 1,6 hexane diamine.

The preferred solvent for the di or tri amines is water. The concentration can range from between about 0.1 to 1.0 molar. Preferably the solution in tank 11 also contains a base such as sodium hydroxide, potassium hydroxide or other acid acceptor such as calcium carbonate or sodium carbonate.

The substrate, as it exits tank 11, is saturated with deposited amine solution and base solution. It is then preferably drip dried in an air blower 12, or by other means. The saturated substrate containing the amine deposit is then passed through a tank 13 containing an organic acid halide such as a diacyl halide solution. The diacyl halide contacts the deposited amine and a membrane is formed on the substrate.

The diacyl halide in solution can be an aliphatic or carbocyclic (aromatic or alicyclic) diacyl halide (chloride, fluoride or iodide). A suitable aromatic diacyl halide would be, for example, ortho, meta or para phthaloyl chloride ($C_6H_4(COCl)_2$). Suitable aliphatic diacyl halides have the formula:

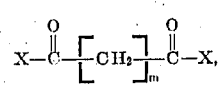

where $m = 4$ to $12$ and $X = F$, $Cl$ or $I$. Particularly useful diacyl halides are adipyl chloride, $m = 4$ and sebacyl chloride, $m = 8$.

The solvent for the acyl halides must be one that is relatively non-solvent for the amide reaction product of the amine and the acyl halide and relatively immiscible in the amine solvent, i.e., soluble in the amine solvent (generally water) up to no more than about 1 wt. percent, with a preferred range between about 0.1 wt. percent and 1.0 wt. percent, so that the following interfacial polycondensation reaction can take place:

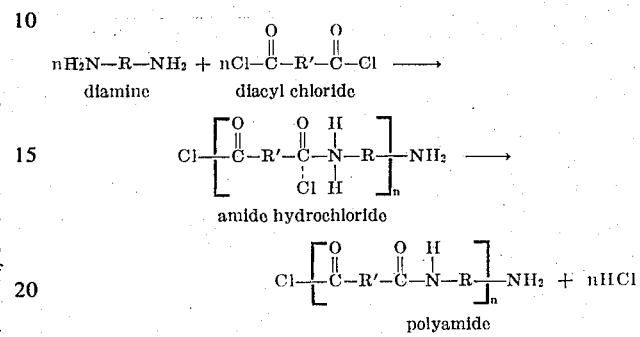

wherein R and R' are selected from aliphatic and carbocyclic radicals heretofore described. Suitable organic solvents for the acyl chloride include trichloroethylene, cyclohexane, benzene, xylene, carbon tetrachloride and chloroform. Base is generally added to the polyamine solution to neutralize the HCl formed by the reaction. The diacyl chloride concentration should range between about 0.005 to 0.5 molar. The mole ratio of polyfunctional amine to polyfunctional acyl chloride should be between about 2:1 to 20:1 depending upon the solvents used. The minimal allowable contact time for these two solutions should be about 5 seconds at room temperature.

The substrate should not contain an excess polyamine solution deposit as it enters tank 13 or it will contaminate the organic solvent contained in tank 13. As the substrate exits tank 13 it will have a high molecular weight polymeric membrane, formed by the interface condensation of amine and acyl chloride, on both of its sides. This membrane may also penetrate into the substrate. This membrane-substrate composite should then be sprayed or washed with water as in washing means 14, after which it may be wound up on take up reel 15, which is preverably stored in a high humidity atmosphere or water, so that the composite does not dry out. The polyamide membranes thus formed on the substrate will be homogeneous and between about 0.1 to 1.0 mils thick. Due to the chemical make-up and to the physical properties of nylons (polyamides), the membrane will be resistant to compaction at reverse osmosis desalination system operating pressures, yet be flexible.

The membrane can coat one or both sides of the substrate, and can be applied continuously or by batch operation to substrates not especially suited to a continuous process, such as fritted glass, perforated metal or compacted granular support systems involving sand and/or other particulate ingredients alone or in combination with resinous binders. The membrane can also be formed by depositing acyl chloride solution on the substrate first and then contacting the deposit with amine solution, either continuously or in a batch operation.

The absolute reaction rates of unhindered aliphatic acid chlorides with primary and secondary diamines are extremely fast. Interfacial polycondensations can be carried out successfully in unstirred low temperature systems employing other reactants having slower reaction rates. For example, polysulfonamide desalination membranes can be prepared in high molecular weight by the reaction of aliphatic or carbocyclic (aromatic or alicyclic) disulfonyl halides (chlorides, fluorides or iodides) and amines such as an aliphatic or carbocyclic (aromatic or alicyclic) primary or secondary diamine or triamine, for example:

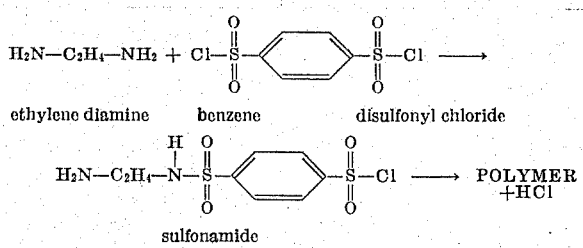

Suitable amines include those heretofore described. Suitable disulfonyl halides include 1,3 benzene disulfonyl chloride; 1,4 benzene disulfonyl chloride; 4,4' biphenyl disulfonyl chloride; 1,5 naphthalene disulfonyl chloride; 2,7 naphthalene disulfonyl chloride; 4,4' disulfonyl chloride diphenyl ether methylene bis (4-benzene sulfonyl chloride) and N,N'-carbonyl disulfonyl chloride. The solvents described above for the acyl halides are suitable for the disulfonyl halides, and water similarly is the preferred solvent for the amine with the same solubility range of the solvents in each other heretofore described being applicable. These membranes are highly useful due to the presence of polar $SO_2$ and NH groups and can be formed in-situ on supporting substrates in accordance with this invention. The minimal allowable contact time for these two solutions should be about 5 minutes at room temperature.

Polycondensations other than polyamidation would also include the formation of polyphenyl esters in unstirred interface condensation systems at low temperature. Polyphenyl ester desalination membranes can be prepared in high molecular weight by the reaction of bisphenol compounds (dihydric diphenols) such as, for example, 2,2-bis (4-hydroxyphenyl) propane; 2,2-bis (4-hydroxyphenyl) methane; 1,1-bis (4-hydroxyphenyl) (cyclopentane; 2,2-bis (4-hydroxy-3-chlorophenyl) propane; bis (4-hydroxyphenyl) sulfone; bis (4-hydroxyphenyl) ether; 1,2-bis (4-hydroxyphenyl) ethane and 2,2-bis (4-hydroxyphenyl) nonane with an aliphatic or carbocyclic (aromatic or alicyclic) diacyl halide as heretofore described. For example:

scribed above for the acyl halides are suitable for this system, while suitable solvents for the bisphenols would include water, alkali-water solutions, ketones and alcohols with the same solubility range of the solvents in each other heretofore described being applicable. These membranes can also be formed in-situ on supporting substrates in accordance with this invention.

The mechanism by which there is effusion or diffusion of pure water through the interfacially formed polyamide membrane and rejection of impurity ions such as chlorides, sulfates and phosphates is not precisely known. The prominent effect of the pore size of the supporting substrate would seem to indicate that the thin polymeric film comprises interlocking polymer chains which extend into the pores of the substrate. There are minute sub-molecular interstices, thought to be between about 10 – 150A, between these polymer chains, and pure water is allowed to diffuse through them while dissolved impurities are rejected. When such a film is extended across a relatively wide substrate pore (say 8 microns), the original interstitial vacancies may open up to increase the flux and decrease the impurity rejection.

Figure 2:
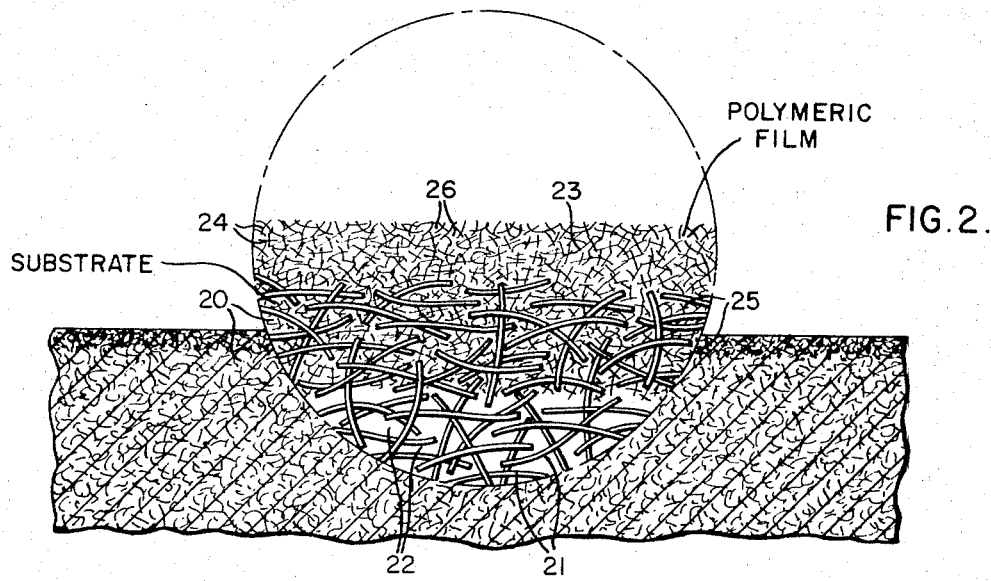
FIG. 2 is a schematic macrorepresentation of one type of desalination membrane in accordance with this invention, showing the membrane in contact with at least one side of a porous supporting substrate.

FIG. 2 shows a schematic illustration of the reverse osmosis desalination membrane-substrate composite of this invention. The supporting substrate 20 will generally comprise interwoven or felted fibers 21 of paper, plastic or glass, which have pores 22 between them. The thin polymeric film 23, formed by the in-situ interface condensation reactions described above, comprises interlocked polymer chains 24 in contact with each other, which generally extend into the pores within the substrate, as at 25. These polymer chains form a uniform membrane cross section and have minute, sub-molecular interstices 26 (up to about 150A) between them, which allow effusion or diffusion of pure water but rejection of dissolved impurities.

The thickness of the interface condensation membrane formed is a function of the degree of miscibility of the solvents for the reactants and each other and a function of the rate of diffusion of either reactant through the formed polymer to reach the other reactant. When immiscible solutions containing the organic reactants are used (cyclohexane and water solvents) very thin membranes are formed. When relatively immiscible solutions are used, (from trichloroethylene and water at about 0.1 percent solubility to chloroform and water solvents at about 1 percent solubility) thicker membranes are formed. A base or other acid acceptor can be used in the polyamine system to neutralize the acid by-product of the condensation reaction and to prevent large bubbles from forming within the substrate.

The polymeric film membrane is formed by an almost

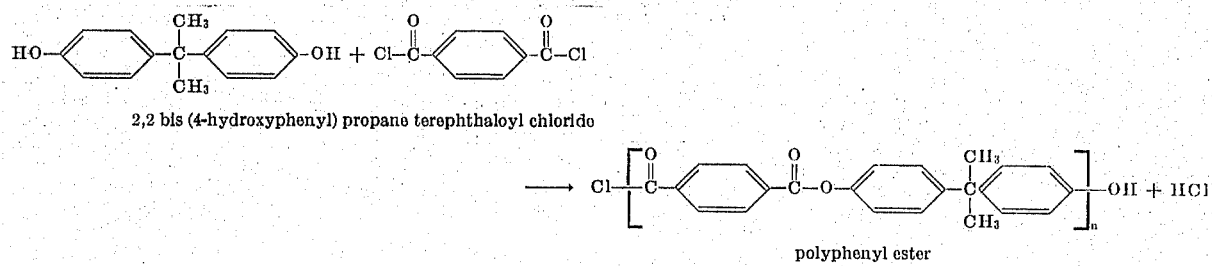

Sodium salts of bisphenols are particularly useful as they provide a faster rate of reaction. The solvents described instantaneous reaction, although improved results accrue when contact time is extended. These membranes are generally very dense, uniform throughout and coherent. They can be compacted to a small degree, there being originally some swelling within the polymeric film and the substrate.

Figure 3:
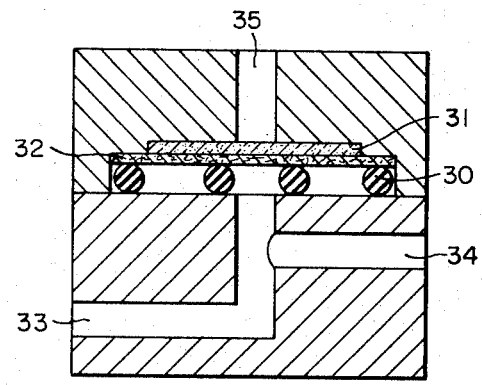
FIG. 3 is a cross-sectional illustration of one of the membrane cells used in testing the desalination membranes of this invention.

The reverse osmosis membrane test system used for testing flat membranes was of the standard type, and used Monel metal and stainless steel as construction materials. Round cells were used for testing 1.0 inch diameter membranes. This cell, used in the Examples, is shown in FIG. 3 of the drawings. The feed water side seal is made with rubber "O" rings 30. The product side collection consisted of a fritted glass disc 31 contacting the osmotic membrane-substrate composite 32. Salt water, or other feed, contacts the membrane after being fed in opening 33. The feed and impurity ions are removed through opening 34 and the purified water through opening 35.

EXAMPLE 1

A 6 mil (0.006 inch) thick circular filter, made of fibrous cellulosic esters, having a diameter of 47 mm. (1.8 inches) and a pore size of 0.054 microns, was dipped for 1.5 minutes in an unstirred, room temperature (25°C.) aqueous 0.8 molar solution of 1,6 hexanediamine in aqueous 1.6 molar sodium hydroxide. The saturated filter was air dried for 1.5 minutes, then dipped for 1.5 minutes into an unstirred, room temperature (25°C.), 0.4 molar solution of adipyl chloride in trichloroethylene solvent. This treatment was followed by a 0.5 minute dip in distilled water to wash the membrane-substrate composite. This procedure provided a membrane about 0.1 to 0.2 mils thick on both sides of the filter.

Membrane-substrate composites made this way were mounted in a steel reverse osmosis test system heretofore described and shown in FIG. 3 of the drawings. Saline water containing 5,200 ppm. impurity salt as NaCl was fed into the cell and against the membrane-substrate composite at 600 psi. After 30 hours exposure, the salt rejection was 80 percent and the pure water flux was 0.49 gal./ft.$^2$-day. After 90 hours exposure, the rejection was 87 percent and the pure water flux was 0.44 gal./ft.$^2$-day. The membranes were run for 4 days without apparent compaction difficulties. The use of a very small pore filter as the substrate, in this Example, contributed to low pure water flux.

EXAMPLE 2

Membrane-substrate composites made according to Example 1, but using m-xylylenediamine and adipyl chloride, with the same polyamine and diacyl chloride concentrations and solvents as in Example 1, gave a salt rejection of 65 percent and a pure water flux of 0.85 gal./ft.$^2$-day, after 90 hours exposure, using a 5,200 ppm. saline feed at 600 psi.

EXAMPLE 3

Membrane-substrate composites made according to Example 1, but using sebacyl chloride, with the same polyamine and diacyl chloride concentrations and solvents as in Example 1, gave a salt rejection of 46 percent and a pure water flux of 0.85 gal./ft.$^2$-day, after 90 hours exposure, using a 5,200 ppm. saline feed at 600 psi.

EXAMPLE 4

Membrane-substrate composites made according to Example 1, but using a circular filter support substrate with a pore size of 0.3 microns and cyclohexane as the solvent for adipyl chloride, with the same polyamine and diacyl chloride concentrations as in Example 1, gave a salt rejection of 85 percent and a pure water flux of 2.5 gal./ft.$^2$-day, after 24 hours exposure using a 5,200 ppm. saline feed at 600 psi. This example demonstrated the importance of the support pore size.

EXAMPLE 5

Membrane-substrate composites made according to Example 4, but using a circular filter support substrate with a pore size of 8 microns with the same polyamine and diacyl chloride concentrations and solvents as in Example 4, gave a salt rejection of 36 percent and a pure water flux of 76 gal./ft.$^2$-day, after 48 hours exposure, using 5,200 ppm. saline feed at 600 psi.

EXAMPLE 6

A 6 mil thick circular filter, made of polyvinyl chloride, having a pore size of 0.3 microns, was dipped for 1.5 minutes in an unstirred, room temperature aqueous 0.8 molar solution of 1,6 hexanediamine in aqueous 0.8 molar sodium carbonate. The excess solution from the lower edge of the round filter was wiped off, and the saturated filter was immersed in an unstirred, room temperature 0.4 molar solution of diphenyl ether disulphonyl chloride in benzene solvent for 4 hours. This treatment was followed by a dip in distilled water. The resulting membrane was about 0.2 to 0.8 mils thick.

Membrane-substrate composites made this way were mounted in a steel reverse osmosis system heretofore described and shown in FIG. 3 of the drawings. Saline water containing 5,200 ppm. impurity salt as NaCl at 600 psi was used. After 65 hours exposure the pure water flux was 1.25 gal./ft.$^2$-day at 28 percent salt rejection.

We claim as our invention:

1. An interface condensation desalination membrane substrate composite, effective to permit the effusion of pure water and the rejection of dissolved salt impurities therein, comprising a substrate having pores between about 0.03 to 8 microns diameter and a membrane layer of polymeric material selected from the group consisting of polyamide, polyphenylester and polysulfonamide polymers which is in contact with the substrate, said membrane formed on the substrate by unstirred interfacial condensation of two fast reacting organic compound solutions, wherein the solvent of each solution is relatively immiscible in the other.

2. The composite of claim 1 wherein the polymeric material has a uniform cross-section and comprises polymer chains having minute interstices therebetween.

3. The composite of claim 2 wherein the porous substrate comprises fibers, at least one side of which is in contact with the membrane layer, the membrane layer extends into said substrate pores, and the interstices between the membrane polymer chains are up to about 150 A diameter.

4. The composite of claim 2 wherein the membrane is formed on the substrate by in-situ interfacial condensation of a disulfonyl halide compound selected from the group consisting of aliphatic disulfonyl halides and carbocyclic disulfonyl halides and an amine compound selected from the group consisting of aliphatic primary diamines, aliphatic secondary diamines, carbocyclic primary diamines, aliphatic primary triamines, aliphatic secondary triamines and carbocyclic primary triamines, to provide a polysulfonamide membrane.

5. The composite of claim 2 wherein the membrane is formed on the substrate by in-situ interfacial condensation of a bisphenol compound and an acyl halide compound selected from the group consisting of aliphatic diacyl halides and carbocyclic diacyl halides, to provide a polyphenyl ester membrane.

6. The composite of claim 2 wherein the membrane is formed on the substrate by in-situ interfacial condensation of an acyl halide compound selected from the group consisting of aliphatic diacyl halides and carbocyclic diacyl halides with an amine compound selected from the group consisting of aliphatic primary diamines, aliphatic secondary diamines, carbocyclic primary diamines, aliphatic primary triamines, aliphatic secondary triamines and carbocyclic primary triamines, to provide a polyamide membrane.

7. The composite of claim 6, wherein the membrane layer is formed by in-situ interfacial condensation of an acyl halide selected from the group consisting of diacyl halides having the formula

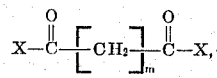

where $m = 4$ to 12 and X is selected from the group consisting of F, Cl and I, and $C_6H_4(COCl)_2$ with an amine selected from the group consisting of diamines having the formula

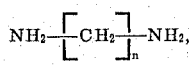

where $n = 2$ to 12, and $C_6H_4(CH_2NH_2)_2$.

8. The composite of claim 2 supported by a resin bonded particulate sand support.

9. A method of making an interface condensation desalination membrane-substrate composite comprising the steps of:
 1. depositing a solution of a first organic compound dissolved in a first solvent on at least one side of a porous substrate, and
 2. contacting said first deposit with a solution of a second organic compound dissolved in a second solvent, said solvents being relatively immiscible in each other, said first organic compound being reactive with said second organic compound, to form a desalination membrane layer of polymeric material in-situ on the substrate by an interfacial condensation reaction.

10. The method of claim 9 wherein the first solvent is soluble in the second solvent up to about 1 wt. percent and the substrate has pores between about 0.03 to 8 microns diameter.

11. The method of claim 9, wherein one organic compound is a disulfonyl halide selected from the group consisting of aliphatic disulfonyl halides and carbocyclic disulfonyl halides and the other organic compound is an amine selected from the group consisting of aliphatic primary diamines, aliphatic secondary diamines, carbocyclic primary diamines, aliphatic primary triamines, aliphatic secondary triamines and carbocyclic primary triamines, to provide a polysulfonamide membrane.

12. The method of claim 9, wherein one organic compound is a bisphenol compound and the other organic compound is a diacyl halide selected from the group consisting of aliphatic diacyl halides and carbocyclic diacyl halides to provide a polyphenyl ester membrane.

13. The method of claim 9 wherein one organic compound is an amine selected from the group consisting of aliphatic primary diamines, aliphatic secondary diamines, carbocyclic primary diamines aliphatic primary triamines, aliphatic secondary triamines and carbocyclic primary triamines and the other organic compound is an acyl halide selected from the group consisting of aliphatic diacyl halides and carbocyclic diacyl halides, to provide a polyamide membrane.

14. The method of claim 13, wherein the amine is selected from the group consisting of diamines having the formula

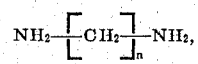

where $n = 2$ to 12, and $C_6H_4(CH_2NH_2)_2$, and the acyl halide is selected from the group consisting of diacyl halides having the formula

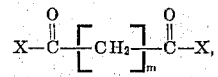

where $m = 4$ to 12 and X is selected from the group consisting of F, Cl and I, and $C_6H_4(COCl)_2$.

15. The method of claim 14, wherein the solvent for the amine is water and the mole ratio of amine to acyl halide in the interfacial condensation reaction is between about 2:1 to 20:1.

16. The method of claim 15, wherein the solvent for the acyl halide is selected from the group consisting of trichloroethylene, cyclohexane, benzene, xylene, carbon tetrachloride and chloroform.

17. The method of claim 16, wherein the substrate is continuously passed through the diamine solution and the acyl halide solution, the substrate is dried between steps (1) and (2) and the membrane-substrate composite is washed after step (2).

18. The method of claim 16, wherein the concentration of the amine in solvent is between about 0.1 to 1.0 molar and the concentration of the acyl halide in solvent is between about 0.005 to 0.5 molar.

19. The method of claim 16, wherein the first organic compound is the amine and the second organic compound is the acyl halide.

* * * * *